(12) United States Patent
Kok (10) Patent No.: US 7,969,493 B2
(45) Date of Patent: Jun. 28, 2011

(54) MATCHING FREE DYNAMIC DIGITAL PIXEL SENSOR

(75) Inventor: Chi Wah Kok, Hong Kong (CN)

(73) Assignee: Intellectual Ventures Fund 27 LLC, Las Vegas, NV (US)

( * ) Notice: Subject to any disclaimer, the term of this patent is extended or adjusted under 35 U.S.C. 154(b) by 701 days.

(21) Appl. No.: 11/385,313

(22) Filed: Mar. 20, 2006

(65) Prior Publication Data

US 2007/0216790 A1    Sep. 20, 2007

(51) Int. Cl.
*H04N 3/14* (2006.01)
(52) U.S. Cl. .................................. 348/308; 348/294
(58) Field of Classification Search .................. 348/208, 348/308, 302, 312, 294, 300, 307; 341/169
See application file for complete search history.

(56) References Cited

U.S. PATENT DOCUMENTS

| | | | |
|---|---|---|---|
| 5,461,425 A | 10/1995 | Fowler et al. | |
| 5,801,657 A | 9/1998 | Fowler et al. | |
| 6,221,758 B1 * | 4/2001 | Liu et al. | 438/626 |
| 6,271,785 B1 * | 8/2001 | Martin et al. | 341/169 |
| 6,518,910 B2 * | 2/2003 | Sakuragi et al. | 341/162 |
| 6,727,486 B2 * | 4/2004 | Choi | 250/208.1 |
| 6,937,279 B1 * | 8/2005 | Kim et al. | 348/308 |
| 6,969,879 B2 * | 11/2005 | Raynor | 257/291 |
| 7,218,260 B2 * | 5/2007 | Lim | 341/122 |
| 7,385,547 B2 * | 6/2008 | Boemler | 341/163 |
| 7,492,401 B2 * | 2/2009 | Lim | 348/300 |
| 2002/0118289 A1 * | 8/2002 | Choi | 348/308 |
| 2004/0263656 A1 * | 12/2004 | Simony | 348/308 |
| 2005/0168251 A1 * | 8/2005 | Lim | 327/131 |

\* cited by examiner

*Primary Examiner* — David L Ometz
*Assistant Examiner* — Ahmed A Berhan
(74) *Attorney, Agent, or Firm* — Schwabe, Williamson & Wyatt, P.C.

(57) ABSTRACT

An active pixel sensor includes a photosensitive device and a dynamic comparator that when coupled with a voltage ramp will form a digital pixel sensor with pulse width modulated digital output. A number of switches are included in the digital pixel sensor to configure the input of the dynamic comparator to couple with the photosensitive device or the voltage ramp such that the dynamic comparator is free from input transistor mismatch problem, as both input use the same input transistor. A cascade of dynamic comparator is disclosed in this invention, such as to improve the sensitivity and conversion speed of the digital pixel sensor. There are a number of switches that connect and isolate the digital pixel sensor from the bit line, which is shared by a plurality of digital pixel sensors in the sensor array. Photosensitive devices in close proximity can share the dynamic comparator by a number of selection switches, such that each photosensitive device can be read out in a time shared manner. Such configuration reduce the average number of transistors in each digital pixel sensor and thus the total silicon area of the sensor array, and hence the cost of production of the image sensor.

18 Claims, 10 Drawing Sheets

FIG. 1

Prior Art

FIG. 2

Prior Art

Prior Art

MATCHING FREE DYNAMIC DIGITAL PIXEL SENSOR

BACKGROUND OF THE INVENTION

Figure 1:
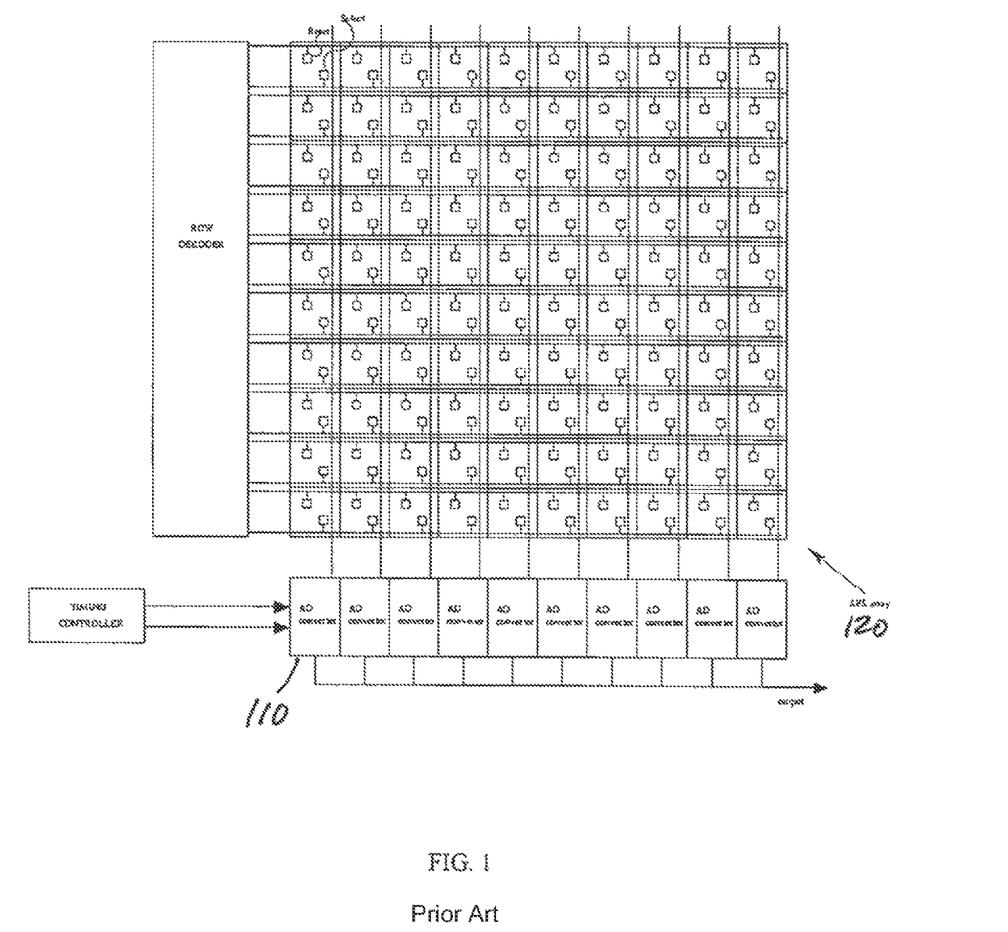
FIG. 1 shows a prior art sensor array with off-array A-D converter.

CMOS active pixel sensors are used in a wide range of imaging applications. The active pixel sensor includes a photodiode acting as a light sensing means. The photo-generated current is being integrated on the self-capacitance of the photodiode. This charge is essentially an analog representation of the light received by the active pixel sensor during the integration period. When a digital signal is desired, it is necessary to convert this analog signal to a digital representation by means of A-D conversion In most applications, multiple CMOS active pixel sensors are used, where the CMOS active pixel sensors are arranged to form an array. Most of the active pixel sensor array use one or more A-D converters 110 located off the active pixel sensor array 120, as shown in FIG. 1. Such arrangement allows a more compact active pixel sensor array being constructed, and, as a result, will enhance the overall circuit efficiency, and thus reduce the cost of the overall product. However, such off active pixel sensor array A-D conversion arrangement suffers from the problem of requiring a relative complex switching or multiplexing circuitry to transfer the analog signal from individual active pixel sensor to the A-D converters. In case of very large active pixel sensor array, it will be very difficult, if not impossible to construct the necessary switching or multiplexing circuit, and hence poor image quality will be obtained.

It has been proposed in literature that each pixel should has its own A-D converter, such that the resulting pixel sensor will output digital signals in a particular encoded form to ease the switching and multiplexing problem. See, e.g., IEEE Journal Solid State Physics, December 2001, vol. 36, no. 12, pp. 2049 and U.S. Pat. Nos. 5,461,425, 5,801,657, 6,271,785 and 6,969,879. However, such architecture has the problem that the additional circuitry required to integrate the A-D converter into the active pixel sensor severely enlarges the size of the resulting sensing array, and thus increase the cost of production.

Figure 2:
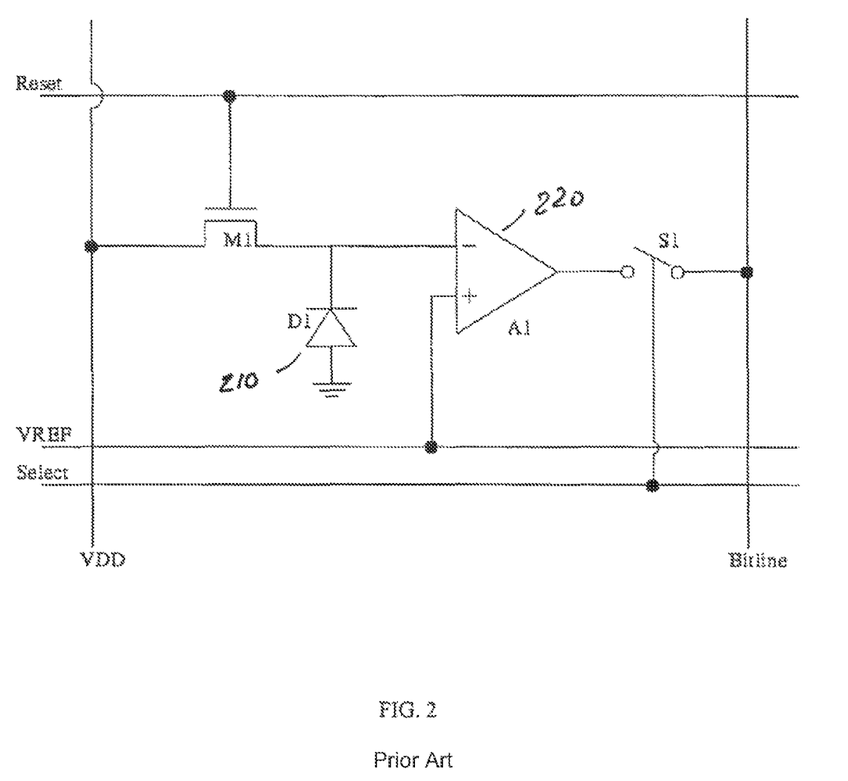
FIG. 2 shows a prior-art active pixel sensor with in-pixel comparator for A-D conversion.
Figure 3:
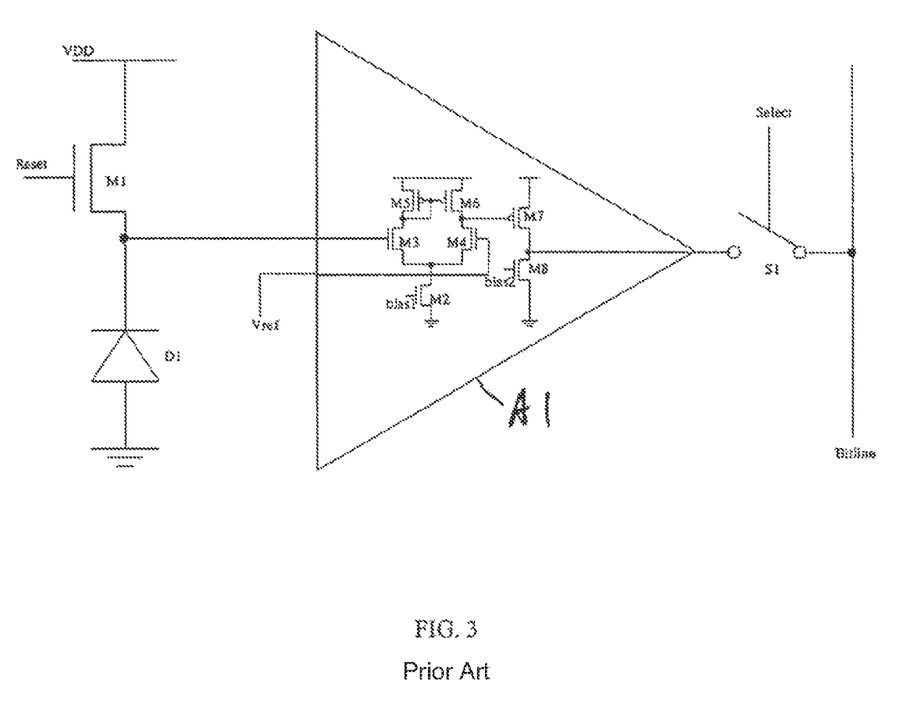
FIG. 3 shows a prior-art active pixel sensor with in-pixel comparator constructed by differential transistor pairs for A-D conversion.

In U.S. Pat. No. 6,969,879, a distributed form has been proposed to embed the A-D converter inside the CMOS active pixel sensor, such that the resulting active pixel sensing array size is comparable to that of the traditional architecture that use analog output and off-array A-D converters. However, this and other proposed CMOS active pixel sensor with in-pixel A-D converter suffers from the problem of mismatched transistors. Within an A-D converter, there is typically a comparator that compares the analog signal from the photodiode 210 to a reference voltage that helps to determine the digital representation of the analog signal of the photodiode, as shown in FIG. 2. Such comparators are conventionally constructed using a differential pair of transistors M3 and M4, as shown in FIG. 3. One of the performance limitations for this type of approach is the input offset due to transistors mismatch of the differential pair. Such offset voltage will results in a "fixed pattern" noise in the final output, and thus lowered the quality of the captured image from the sensor array.

Another problem of such differential pair is the relatively large power consumption. In order to maintain a fast conversion speed, the differential pair transistors are biased in the active region, and thus consume static power. In case of a large sensor array is under concern, the total power consumption will be very high that it will preclude the above devices to use in a lot of applications, such as portable applications, etc. where the battery power is limited. Secondly, the large power consumption will induce a large amount of heat that will increase the packaging cost since efficient heat dissipation package is required. Nevertheless, such image-sensing array with high heat dissipation may still be not useful in applications where limited device area is available, such as portable applications.

Lastly, such comparators, which make use of differential transistor pairs are still too large to be embedded inside each pixel. To remedy this problem, U.S. Pat. No. 6,969,879 proposed a distributed structure in order to reduce the average number of transistor per pixel, thus the total size of the sensor array. In U.S. Pat. No. 6,969,879, the comparator is divided into input stage that contain the differential transistors pair and the output stage that contains the current mirror providing currents to the differential transistors pair (M3 and M4). Each pixel will contain its own differential transistor pairs, however, pixels along the same column will share the same current mirror (M5, M6, M7 and M8) for all the differential transistors pair. Using such distributed comparator architecture, the total number of transistors is reduced at the expense of increased offset voltage. As a result, high quality image sensor cannot be constructed using such distributed architecture.

There is thus a need to improve the way to embed the comparator within the CMOS active pixel sensor for A-D conversion without the transistor-matching problem, the high power consumption problem, and with a small number of average transistors per pixel.

SUMMARY

The invention is aimed at providing an active pixel sensor with integrated comparator for A-D conversion with an external reference voltage, where the comparator does not suffer from transistors mismatch problem, has low power consumption, and is small on silicon layout.

Figure 4:
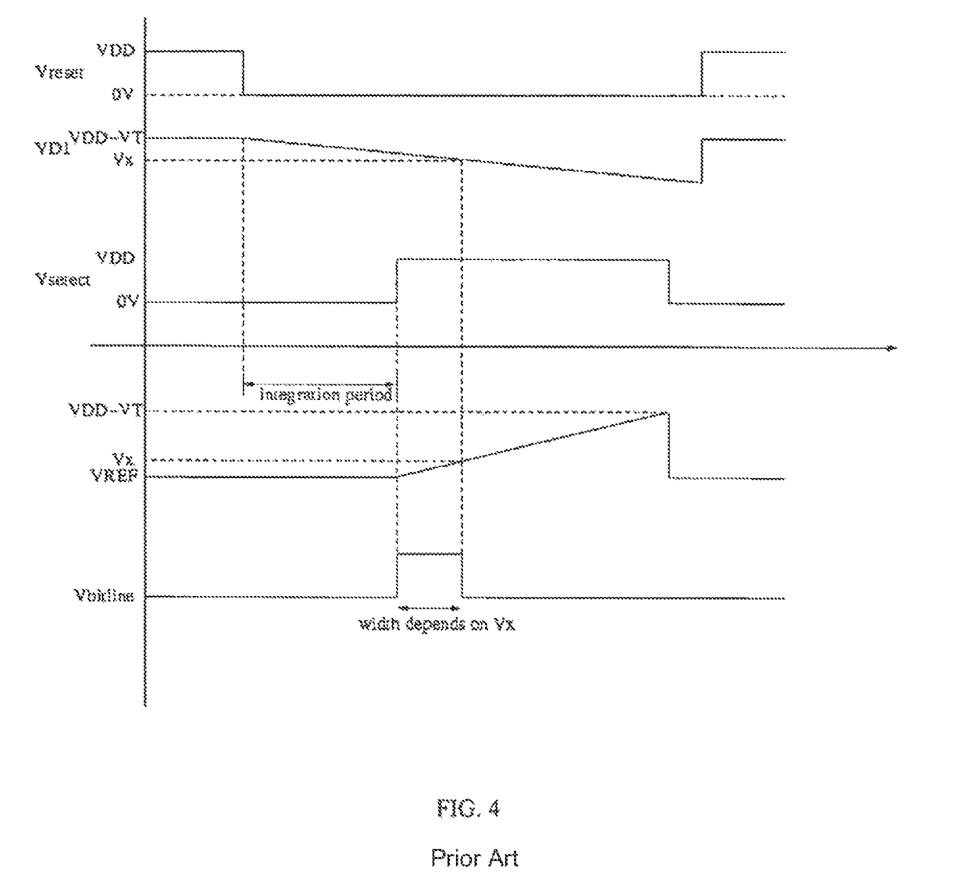
FIG. 4 shows the operating voltage of the active pixel sensor with in-pixel comparator for A-D conversion in FIG. 2.

FIG. 2 shows a prior art approach to an image sensor having in-pixel circuitry for A-D conversion. The voltage stored inside the photodiode after integration period is coupled to the comparator A1. The operating voltage of the in-pixel A-D converter is shown in FIG. 4. As shown in FIG. 3, the comparator A1 includes differential transistor pairs M3 and M4 as the input differential pair. Even with a careful layout, transistors M3 and M4 will not be able to match accurately. Moreover, because of manufacturing tolerances such mismatch is likely to vary between pixels, causing fixed pattern noise.

Traditionally, correlative double sampling is applied to cancel such offset in devices such as that disclosed in U.S. Pat. No. 6,969,879. With the application of correlative double sampling, the photodiode output voltage right after the reset period is measured once. Then the photodiode output voltage after the integration period is measured. The measured photodiode output voltage after the integration period is subtracted from that after reset. Theoretically, the resultant voltage difference should be free from offset voltage due to mismatch problem of the differential stage of the comparator. However, the offset voltage of the differential stage of the comparator is a function of the input voltage, and is not a constant. Therefore, removing the offset voltage at reset period will not be able to remove all the offset voltage. As a result, significant fixed pattern noise is still observed in the A-D converted output after correlative double sampling.

To overcome the fixed pattern noise due to transistor mismatch problem of the differential pair of the transistors used in the comparator, embodiments of the invention employ comparators that uses a single transistor in the input stage for both the signal from the sensor and the reference signal.

DETAILED DESCRIPTION OF ILLUSTRATIVE EMBODIMENTS

Figure 5:
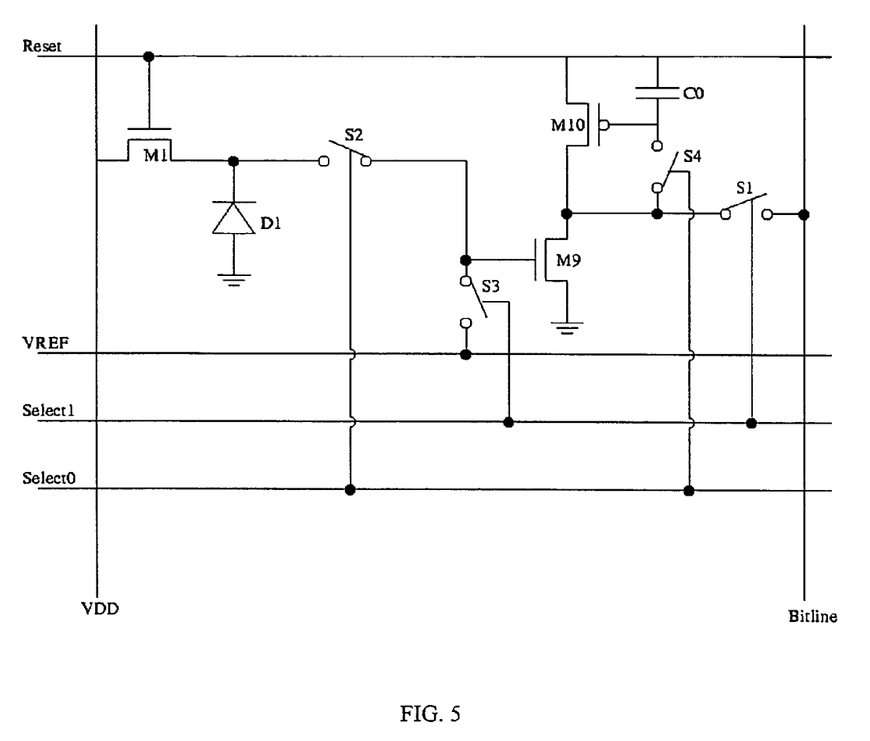
FIG. 5 shows CMOS dynamic active pixel sensor in one embodiment of the invention.
Figure 6:
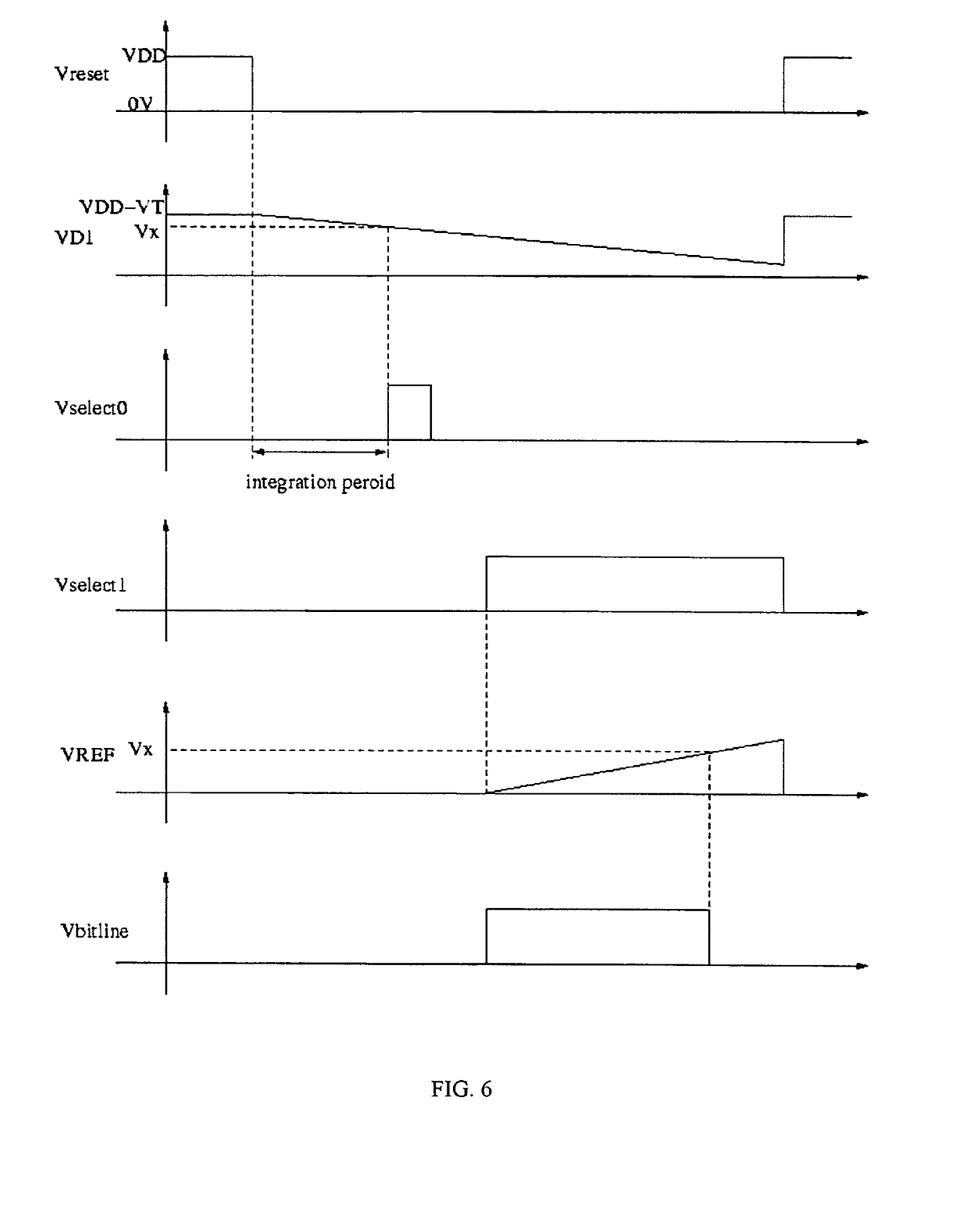
FIG. 6 shows the operating voltage of a CMOS dynamic active pixel sensor shown in FIG. 5.

In one embodiment of the invention, a matching free CMOS dynamic active pixel sensor is shown in FIG. 5. The photodiode D1 is connected to a reset transistor M1, which resets the photodiode to an initial integration voltage of ($V_R-V_T$), wherein the $V_R$ is the reset voltage (which in the case of FIG. 5 equals VDD), and the voltage $V_T$ is a threshold voltage of the reset transistor M1. This is known as the reset period of the sensor. After the reset period, the photons are collected and converted into an electrical signal through the photodiode D1. This is known as the integration period. At the end of the integration period, the voltage stored inside the photodiode D1 will be coupled to a dynamic comparator through switch S2, which can be implemented by N-channel transistor, or other switching device. As shown in FIG. 5, when S2 is closed, S4 will also be closed. The voltage stored inside D1 will be coupled to the gate of a N-channel transistor M9 through S2. The drain-source current Ids9 of the transistor M9 is dependent on Vgs9 and is monotonically increasing with increasing Vgs9. The notation Ids9(V1) denote the corresponding drain-source current of the transistor M9 with Vgs9 equals V1. This current is copied to the drain-source current of the transistor M10 at the readout stage when S2 and S4 are both closed. That is, Ids10=Ids9(V1). This is known as the sampling period. After the sampling period, S2 and S4 will open, and the gate of M10 is floating. The gate-source voltage of M10 will be held constant as that at the sampling period by the capacitor C0, which can be the parasitic gate-source capacitor, or a discrete capacitor. After the sampling period, the conversion period follows, where S1 and S3 are closed. Because the gate-source voltage of M10 is maintained, the drain-source current of M10 remains equal to Ids10=Ids9(VD1), where VD1 is the output voltage of the diode D1 after the integration period. VD1 in this case equals to Vx as shown in FIG. 6. At the same time, the drain-source current of M9 changes to Ids9(Vref), where Vref denotes the reference voltage. If these two currents are not exactly identical, a difference current is generated, which will bring the unloaded output of the comparator into saturation (i.e., the output is tied to one of the supply voltages VDD or VSS depends on the value of Vx−Vref). To convert the analog voltage Vx of the photodiode output after the integration period to a digital signal, a voltage ramp from 0V to VDD with constant ramp up rate is applied to the comparator at Vref. The output of the comparator will therefore be equal to VDD at the start of the ramp, and flip to VSS when Vx<Vref. It will then stay in VSS until the end of the ramp up period. As a result, the time to achieve a change of output from VDD to VSS represents the analog signal Vx. This is a pulse width modulated output of the digital pixel sensor. The detail operating voltage of the disclosed CMOS dynamic active pixel sensor is shown in FIG. 6.

Figure 7:
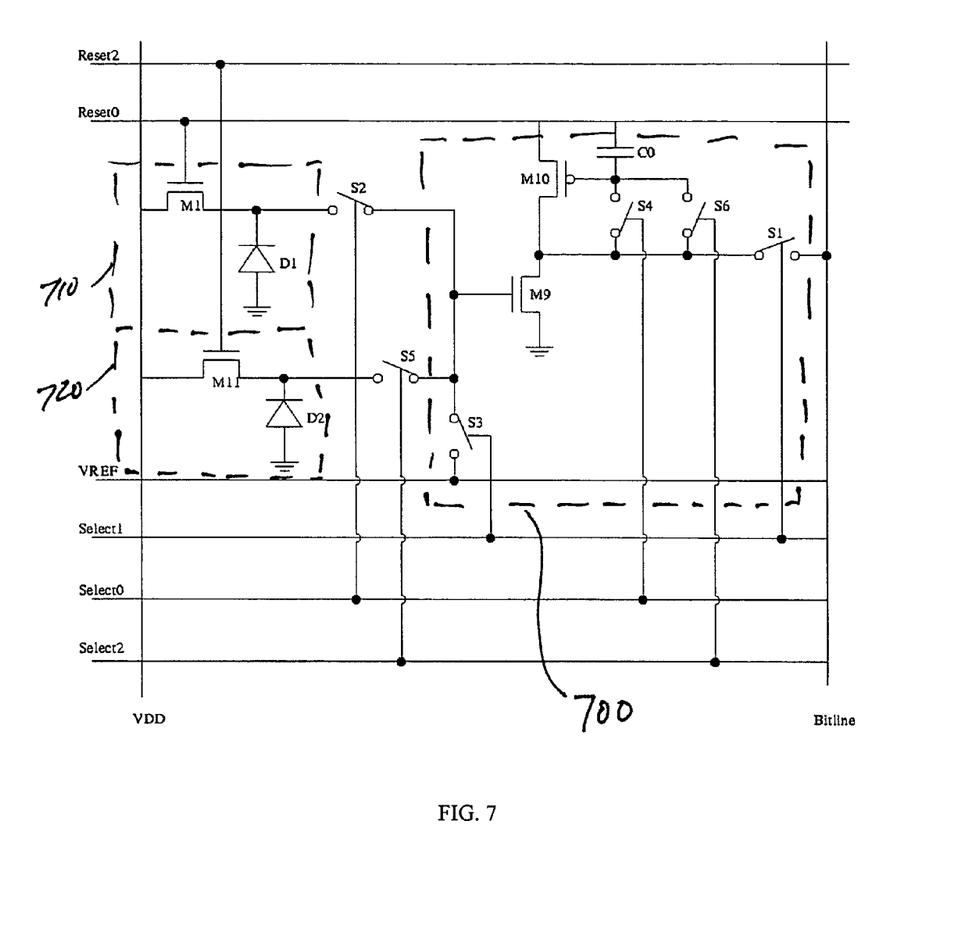
FIG. 7 shows the circuitry of the CMOS dynamic active pixel sensor in FIG. 5 shared among two pixels in close proximity in another embodiment of the invention.
Figure 8:
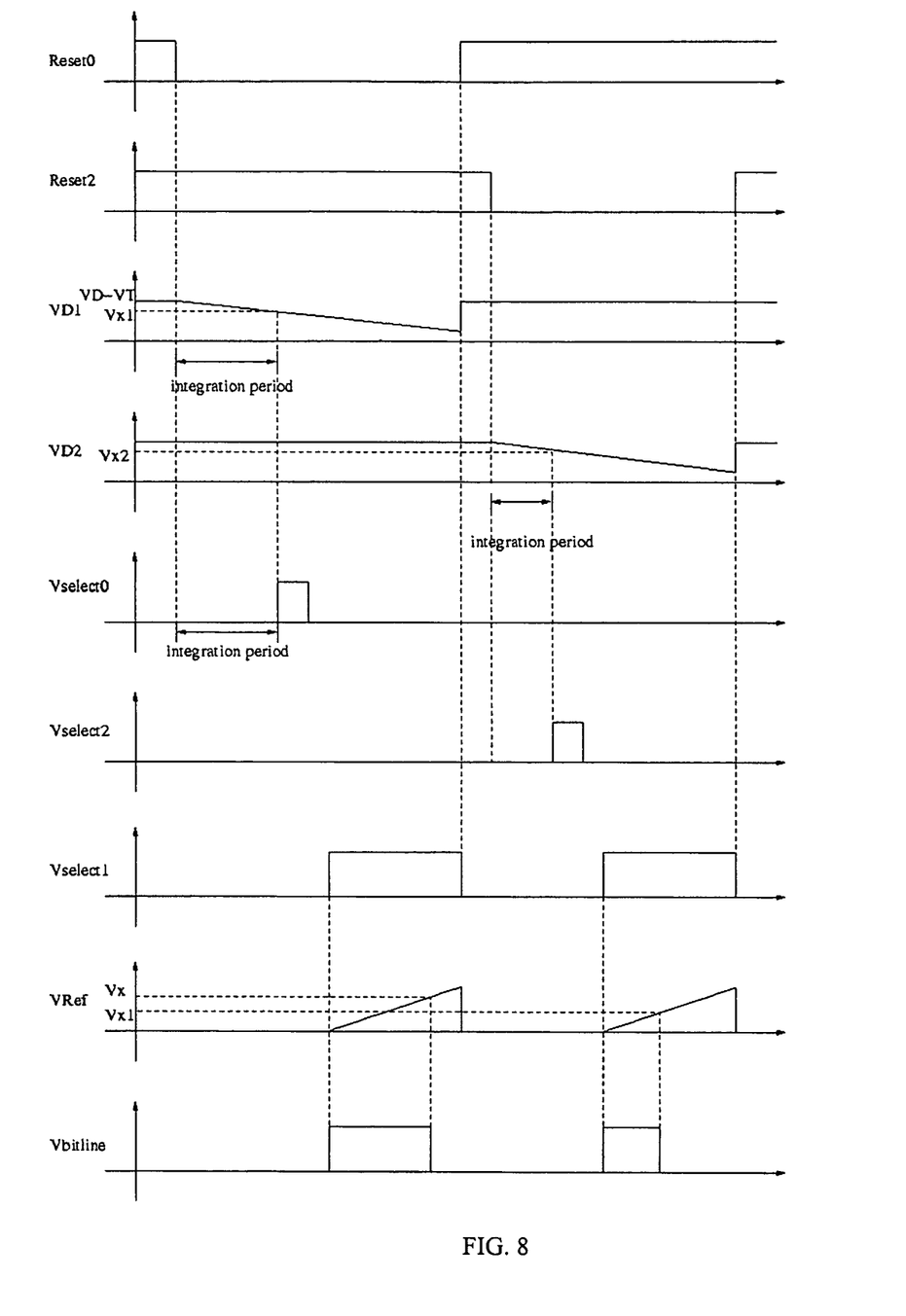
FIG. 8 shows the operating voltage of the CMOS dynamic active pixel sensor shared among two pixels in close proximity as shown in FIG. 7.

In another illustrative embodiment of the invention, the dynamic comparator is shared amount a number of photodiodes placed in close proximity, so as to reduce the average number of transistors used in each pixel. The lower the average number of transistors used for each pixel, the smaller the silicon size to implement the sensor array, and hence the lower the cost of the silicon. FIG. 7 shows an example of such sharing structure, in which the read-out structure 700 is shared among two pixels 710 and 720 in the same column of the sensor array. The operating voltage of the disclosed circuit in FIG. 7 is shown in FIG. 8.

Figure 9:
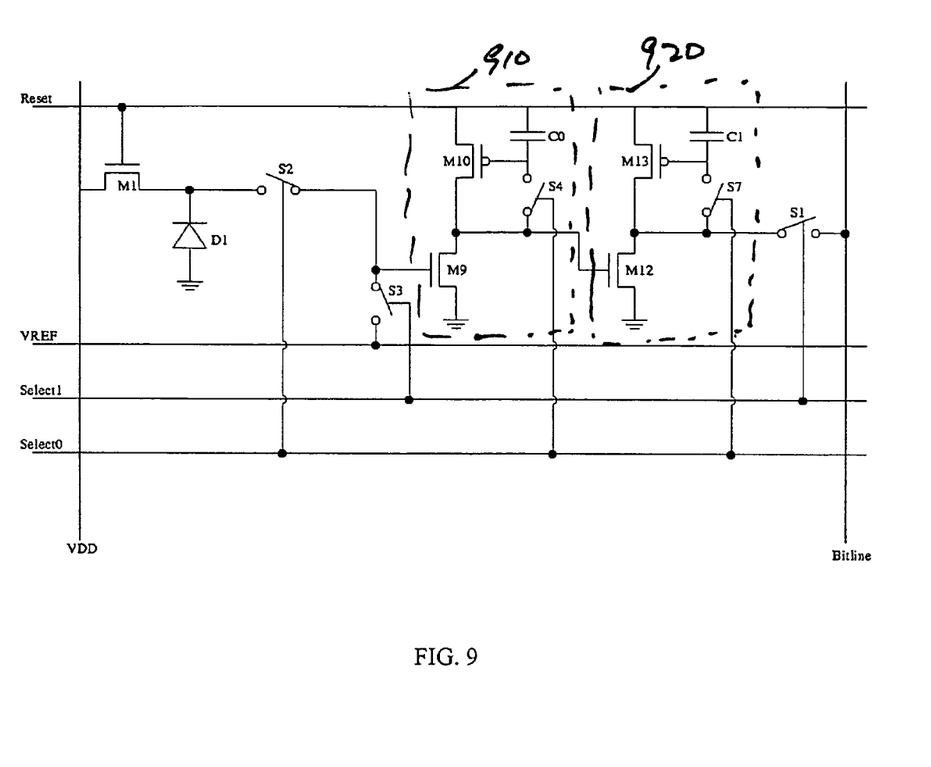
FIG. 9. The circuitry of a CMOS dynamic active pixel sensor with cascaded comparators in another embodiment of the invention.

In another embodiment of the invention, the conversion performance of the comparator can be enhanced by using a cascade structure of comparators, as shown in FIG. 9. To construct a high sensitivity active pixel sensor, the comparator should be able to resolve small differences between VD1 and Vref. In this case, the output parasitic load cannot be neglected. Consider the output parasitic load as an output conductance G0 in parallel with an output capacitance C0. The output voltage drop between the beginning and the end of the conversion time is $$dV\text{out}=(i/G0)(1-\exp(-T \cdot G0/C0)),$$

where T is the "on" time period of the comparator output and i is the charging current for the capacitor C0. Assuming that the clock rate is low, such that T·G0/C0>>1, the voltage drop can be approximated by i/G0, which is the DC gain of the comparator. To increase the gain and as a consequence the sensitivity of the comparator, the cascaded structure as shown in FIG. 9 can be used, where two dynamic comparators 910 and 920 are cascaded.

An n-stage comparator will exhibit an overall gain A equal to A1×A2×...×An, where Ak is the voltage gain of the stage k comparator. Such cascade structure can resolve small difference between VD1 and Vref, because at each stage, the drain-source current of the input transistor can be considered as a linear function of Vk1−Vk2, where Vk1 is the input voltage of stage k during read out, and Vk2 is the input voltage for stage k during conversion. The resolution of the input voltage difference of the comparator would be given by $$\Delta V=|VDD-VSS|/A.$$

Figure 10:
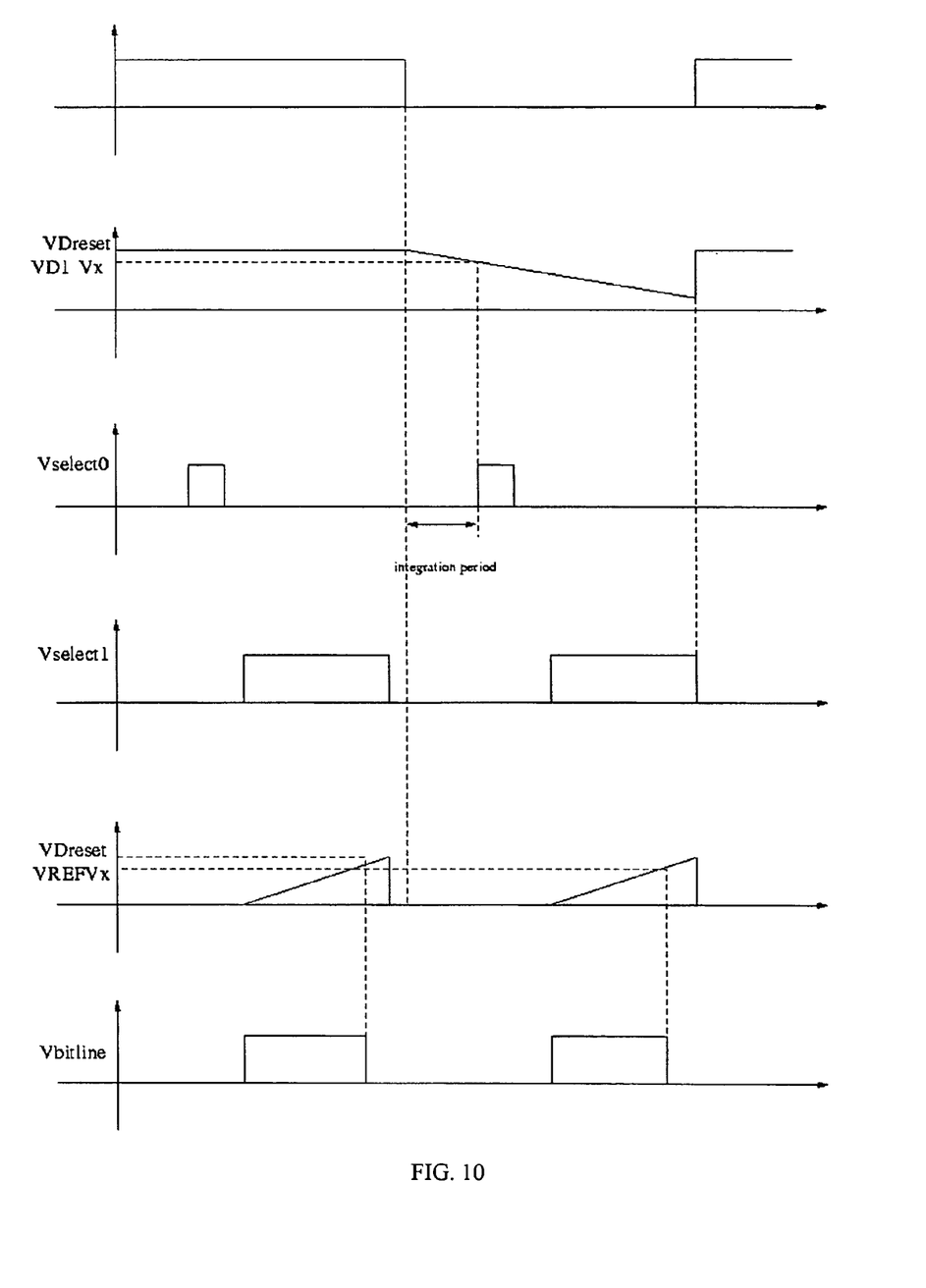
FIG. 10 shows the operating voltage of a CMOS dynamic active pixel sensor operating in correlative double sampling mode in another embodiment of the invention.

In another embodiment of the invention, the disclosed CMOS dynamic active pixel sensor can operate in correlative double sampling mode. FIG. 10 is a graph showing the operation voltage of the disclosed circuit in correlative double sampling mode. As observed from FIG. 10, an extra conversion period is inserted right after the reset period to read out the photodiode voltage right after reset. This voltage will be subtracted from that read out after the integration period. The resultant will be free from fixed pattern noise due to offset voltage of the comparator (because of the application of mismatch free comparator) and is also free from fixed pattern noise due to $V_T$ variation of the reset transistor. As a result, better image quality is expected when applying correlative double sampling to the disclosed CMOS dynamic active pixel sensor.

What is claimed is:

1. An imaging device, comprising:
a photosensor configured to receive a dosage of radiation and to produce, at an output terminal of the photosensor, an analog signal having a magnitude corresponding to an intensity of the dosage; and
a comparator including a first transistor and a second transistor, each having a channel coupled in series with the other, wherein:
the comparator is configured to receive, at a gate terminal of the first transistor, the analog signal in a first time frame and a reference signal in a second time frame;
a gate terminal of the second transistor is coupled to a source terminal of the second transistor via a capacitor;
the second time frame is different from the first time frame; and
the comparator further comprises an output terminal coupled to the first and second transistors, and wherein the comparator is further configured to generate, at the output terminal and during the second time frame, an output signal corresponding to the intensity of the dosage.

2. The imaging device of claim 1, wherein the comparator is further configured to generate the output signal based at least on a difference between the analog signal and the reference signal.

3. The imaging device of claim 1, wherein the comparator is further configured to maintain, during the second time frame, a signal corresponding to the analog signal and to generate the output signal as a function of a difference between the maintained signal and the reference signal.

4. The imaging device of claim 3, wherein the output signal is a pulse having a width corresponding to the magnitude of the analog signal.

5. The imaging device of claim 4, wherein the reference signal is a linear-ramp reference signal.

6. The imaging device of claim 1, wherein:
the first transistor has a source-drain current response that is dependent monotonically on a gate-source voltage across the gate terminal and a source terminal of the first transistor;
the capacitor coupled between the gate terminal and the source terminal of the second transistor is configured to maintain a signal corresponding to the analog signal at the gate terminal of the second transistor; and
the comparator further comprises:
one or more first switches through which the gate terminal of the first transistor is coupled to the output terminal of the photosensor in the first time frame and the comparator is configured receive the reference signal at the gate terminal of the first transistor in the second time frame; and
one or more second switches configured to couple a drain terminal of the second transistor to the gate terminal of the second transistor in the first time frame and configured to couple the drain terminal of the second transistor to the output terminal of the comparator in the second time frame.

7. The imaging device of claim 6, wherein the first transistor is an N-channel transistor and the second transistor is a P-channel transistor.

8. The imaging device of claim 1, further comprising another photosensor having an output terminal and configured to receive another dosage of radiation, wherein:
the other photosensor is further configured to produce, at the output terminal of the other photosensor, another analog signal having a magnitude corresponding to an intensity of the other dosage;
the comparator is further configured to receive, at the gate terminal of the first transistor, the other analog signal from the other photosensor in a third time frame and to receive another reference signal in a fourth time frame;
the comparator is further configured to generate, at the output terminal, during the fourth time frame, another output signal corresponding to the other analog signal; and
the third time frame and the fourth time frame are different from the first time frame, the second time frame, and from each other.

9. The imaging device of claim 1, further comprising another comparator including an output terminal, wherein the other comparator is configured to receive the output signal and to generate, at the output terminal of the other comparator, another output signal corresponding to the analog signal.

10. An imaging device, comprising:
a photosensor having a photosensor output terminal and configured to receive a dosage of optical radiation and to generate an output signal of the photosensor corresponding to a level of the dosage; and
a dynamic comparator, including:
a comparator input terminal at which the dynamic comparator is configured to receive the output signal of the photosensor in a first time frame and to receive a reference signal in a second time frame, wherein the second time frame is different from the first time frame;
a first current source configured to generate a first current in the first time frame with a first magnitude that is monotonically dependent on the output signal of the photosensor at the comparator input terminal;
a second current source coupled to the first current source and configured to generate a second current in the first time frame, wherein the second current has a second magnitude dependent upon the first magnitude, and wherein the second current source is further configured to maintain a third current having a third magnitude independent of a fourth magnitude of a fourth current generated by the first current source in the second time frame; and
a comparator output terminal at least intermittently coupleable to the first and second current sources;
wherein the first and second current sources are configured to cooperatively generate, at the comparator output terminal and in the second time frame, a voltage corresponding to a difference between the third and fourth magnitudes;
the first current source comprises a first transistor having a gate terminal coupled to the comparator input terminal;
the second current source comprises a second transistor which has a channel coupled in series with a channel of the first transistor; and a gate terminal of the second transistor is coupled to a source terminal of the second transistor via a capacitor.

11. The imaging device of claim 10, wherein:
the first current source is configured to generate, through a source terminal and a drain terminal of the first transistor, the first and fourth currents in the first and second time frames, respectively; and
the second current source further includes one or more output switches configured to couple a drain terminal of the second transistor to the s gate terminal of the second transistor in the first time frame and to couple the drain terminal of the second transistor to the comparator output terminal in the second time frame.

12. The imaging device of claim 10, further comprising one or more input switches, wherein the comparator is configured to receive the output signal from the photosensor via the one or more input switches in the first time frame, and to receive the reference signal via the one or more input switches in the second time frame.

13. The imaging device of claim 10, wherein the first and second magnitudes are equal.

14. A method, comprising:
generating, by a photosensor of an imaging device and at an output terminal of the photosensor, an analog signal corresponding to a level of dosage of radiation;
generating a quantized reference signal;
sequentially receiving, at a gate terminal of a first transistor of a comparator of the imaging device, the analog signal in a first time frame and the reference signal in a second time frame, wherein the second time frame is different from the first time frame;
storing a stored signal corresponding to the analog signal in the comparator during the second time frame, using a second transistor of the comparator, wherein the second transistor is coupled to the first transistor in series, and wherein a gate terminal of the second transistor is coupled to a source terminal of the second transistor via a capacitor; and
generating, at an output terminal of the comparator of the imaging device, during the second time frame, an output signal corresponding to a difference between the analog signal and the reference signal, wherein the output terminal is coupled to the first and second transistors.

15. The method of claim 14, wherein the output signal corresponds to a difference between the stored signal and the reference signal.

16. The method of claim 14, further comprising generating a first current corresponding to the analog signal in the first time frame, generating a second current corresponding to the reference signal in the second time frame, and maintaining a third current having a predetermined relationship to the first current in the second time frame, wherein the output signal corresponds to a difference between the third and second currents;
wherein said generating a first current comprises driving a first transistor with the analog signal in the first time frame;
wherein said generating a second current comprises driving the first transistor with the reference signal in the second time frame; and
wherein said maintaining a third current comprises loading the first transistor with the second transistor in the first time frame and maintaining a bias voltage having a predetermined relationship to the first current on the second transistor during the second time frame.

17. The method of claim 16, wherein the common input terminal is a gate terminal of the first transistor.

18. The method of claim 14, wherein the quantized reference signal is a stepwise ramped signal.

* * * * *

UNITED STATES PATENT AND TRADEMARK OFFICE
CERTIFICATE OF CORRECTION

| | | |
|---|---|---|
| PATENT NO. | : 7,969,493 B2 | Page 1 of 1 |
| APPLICATION NO. | : 11/385313 | |
| DATED | : June 28, 2011 | |
| INVENTOR(S) | : Kok | |

It is certified that error appears in the above-identified patent and that said Letters Patent is hereby corrected as shown below:

Column 5, line 61, in Claim 6, delete "configured receive" and insert -- configured to receive --.

Column 6, line 62, in Claim 10, delete "the" and insert -- wherein the --.

Column 6, line 65, in Claim 10, delete "the" and insert -- wherein the --.

Column 7, line 1, in Claim 10, delete "a gate" and insert -- wherein a gate --.

Column 7, line 11, in Claim 11, delete "the s" and insert -- the --.

Column 7, line 16, in Claim 12, delete "comparator is" and insert -- dynamic comparator is further --.

Column 7, line 18, in Claim 12, delete "frame," and insert -- frame --.

Signed and Sealed this
Fifteenth Day of November, 2011

David J. Kappos
*Director of the United States Patent and Trademark Office*